Oct. 19, 1937. G. F. McDOUGALL 2,096,287
PRIMER VALVE
Filed April 17, 1937
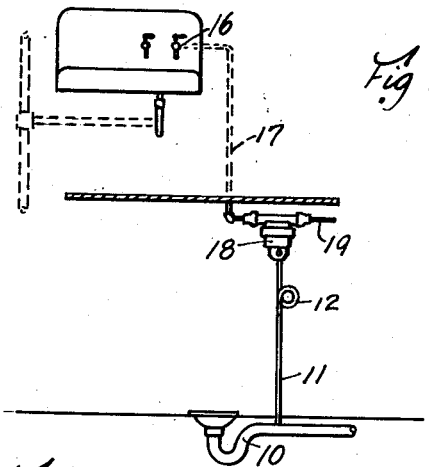
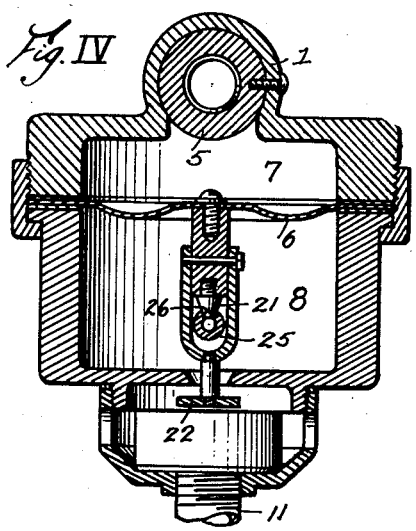
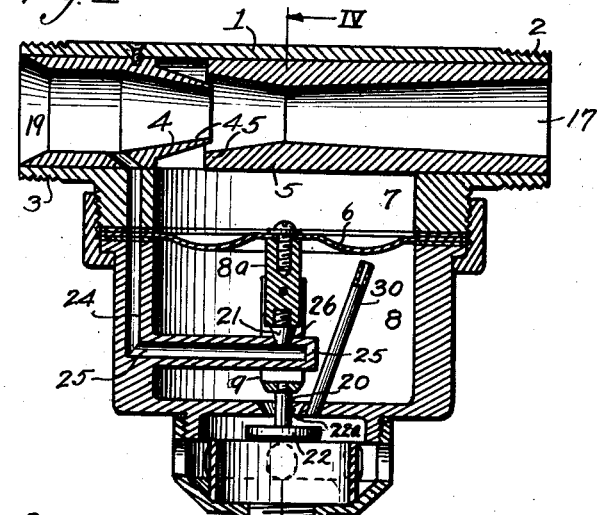
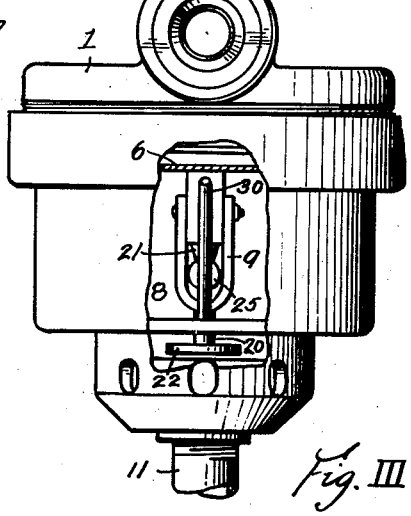
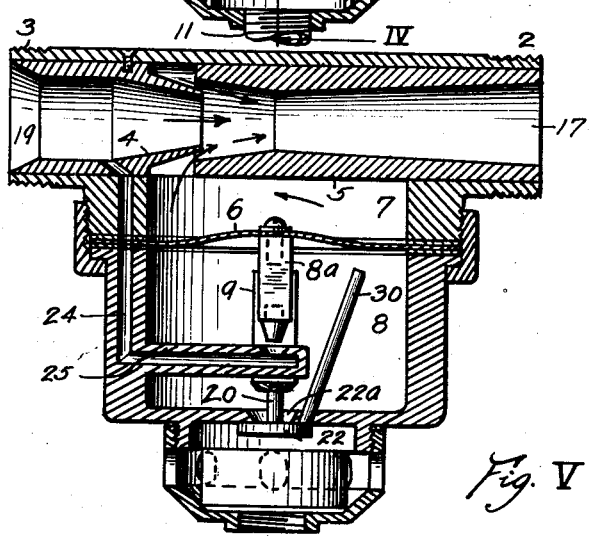
Inventor:
George F. McDougall Patented Oct. 19, 1937

2,096,287

UNITED STATES PATENT OFFICE 2,096,287

PRIMER VALVE

George F. McDougall, Portland, Oreg.

Application April 17, 1937, Serial No. 137,508

9 Claims. (Cl. 182—12)

This invention relates to primer valves, which are appliances insertable in a water supply line to a frequently used or master fixture and which operate whenever the master fixture is used to deliver a small quantity of water to the trap of an infrequently used fixture, such as a cellar drain trap, just below the floor of a cellar, to a conventional laundry tray trap or other trap liable to dry out and leave an open flow-way for sewer gases to the interior of a building.

Primers are not a new thing as a search of patent records will disclose. Among the first is Patent No. 815,691 to Ericcson, which is essentially a body within which is fitted a movable piston with discs extending across and substantially closing off the flow passageway to a master fixture, but movable to uncover a comparatively free outlet to such fixture, the moving of the piston lifting a small valve off its seat and thus allowing a small quantity of water to flow through a branch pipe for trap priming purposes. A number of modifications of the Ericcson structure have been patented as improvements but are essentially the same as they all embody a more or less tightly fitted movable piston in the barrel of the device, such as Patent No. 1,799,826 to Goss.

An infirmity of all piston primers is liability to open and remain open due to grit or scale preventing the piston from returning to close off the trap pipe.

Some of the objects of the present invention are as follows:—

A flow actuated primer mechanism which contains no moving part in the water channel to the master fixture, such as a plunger valve of the type referred to, and which contains no part movable in frictional engagement with another part. In case the water system is drained for any purpose it should offer no obstruction to return flow, draining the pipe beyond it as fast as water will flow by gravity. The flow impedance when the master fixture is used to be much less than when a weighted or spring loaded valve is used.

Instead of permitting a restricted but continuous flow while the master fixture is open, it shall fill a small measuring chamber during such flow and discharge the contents thereof to the branch trap priming pipe when the fixture is closed, the supply to the chamber being likewise closed.

It will not operate to fill the measuring chamber unless the master fixture is substantially open; consequently will not aggravate waste from a leaky faucet on the master fixture.

It shall not be adversely affected by scale or impurities carried by a water supply that are not capable of equal interference with ordinary fixtures, a bath-tub tap being taken as a criterion.

The entire "insides" shall be replaceable without removing the body from the supply line.

It must be so inherently rugged that it can safely be guaranteed to operate for several years at a time without attention and "new insides" should be inexpensive to make and deliver.

It must provide an air gap between the instrument itself and the pipe leading to the trap that is at least equal in area to the area of the trap pipe.

A further object is an instrument of the character indicated that is not necessarily set perfectly level to operate properly.

These and other objects that will be apparent and which are set forth in the claims, constitute the objects of the present invention.

The primer, according to the preferred form of this invention, is composed of two essential but separate mechanisms; a body containing a chamber within which are positioned ejector elements to lower the pressure in the chamber and having a diaphragm forming one wall of the chamber that is flexible to alternately move under the influence of varying pressure in the chamber, and a small measuring receptacle or chamber separately connected to a water supply and a trap priming conduit with appropriate valves for filling and emptying the receptacle from the supply to the conduit. For convenience these two units are contained in the same structure but would function just as well if they were entirely separated, except for the necessary interconnections to operate control devices affecting emission of water from the branch channel each time a master fixture was opened. The mechanical construction of this device may be varied widely without departing from the principle of control herein disclosed which is essentially this; a flexible diaphragm is so mounted that pressure against it varies according to whether water is flowing to a master fixture in considerable quantity or substantially at rest. Variations of pressure cause the diaphragm to yield inwardly or outwardly and transmissions are arranged to employ the movements of the diaphragm to control flow of a small quantity of water for trap priming purposes, which control may take the form of a continuous small flow while the master fixture is using water, or a measuring chamber may be filled each time the master fixture is used and emptied into a trap priming conduit when such use is stopped. For reasons of economy of water use, I prefer the latter mode, mechanisms for which are illustrated in the drawing, in which,—

Fig. I is a diagrammatic view showing a primer inserted in a water supply pipe to a master fixture or frequently used fixture such as a kitchen sink;

Fig. II is a longitudinal section of the device of this invention showing it in its static condition wherein it will be supposed to be under pressure of water in the supply line, or where the control valve of the master fixture is shut and no water is being used;

Fig. III is an end view of Fig. II in part broken away to show the interior arrangement;

Fig. IV is a cross section of Fig. II with the primer parts in the same position and will be deemed to be connected in a water supply line under pressure; and Fig. V is the same structure shown in Fig. II except that in this view the control valve of a master fixture will be deemed to be open and using water.

In Fig. I, 16 is a control valve of a master fixture. 17 is the pipe leading through the primer to supply the control valve. 18 is the primer assembly. 19 is the water supply line under pressure. 10 is a trap to be primed. 11 is a trap pipe carrying priming water from the primer proper 18, and 12 is a gas trap.

In the primer itself, see Fig. II, 1 is a body member adapted to be inserted in a water supply line, the threaded portions 2 and 3 adapting it for that purpose. Aligned in the body 1 are the ejector tubes 4 and 5 comprising the well known ejector and positioned below the ejector, which as a whole will be designated by 45, is a flexible diaphragm 6, delimiting a chamber 7 and constituting a common wall between the ejector chamber 7 and a measuring chamber 8. Made rigid with the diaphragm 6 at the approximate center thereof, is a valve carrier 8a which may be made integrally or by assembly to include a yoke 9, and a valve stem 20. This valve carrier, 8a, carries two valves 21 and 22.

In this figure, 19 will represent the source of water supply under pressure and 17 is the line leading to a discharge fixture. Connected with the supply under pressure represented by 19 is a channel 24, a continuation of which is found in the pipe 25 which embodies a valve seat 26 with which the valve 21 is engageable under the influence of motion communicated from the diaphragm 6. 30 is an air tube arranged to prevent air binding of the measuring chamber 8.

The operation of this apparatus is obvious. In the at rest or static condition of the apparatus, when inserted in a water supply line under pressure, full pressure will exist in the chamber 7 and the downward load on the diaphragm 6 will be such that the valve 21 firmly engages the valve seat 26 as shown in Fig. II while the valve 22 is open and the contents of the measuring chamber 8, if any, are free to discharge through the trap pipe 11.

As soon as substantial flow is promoted by opening the master fixture 16 to a considerable extent, pressure in the chamber 7 changes in value, greatly lowers and will, if the master fixture 16 is wide open, tend to create a vacuum in the chamber 7. This causes the diaphragm 6 to move inwardly toward the chamber 7 as shown, somewhat exaggerated, in Fig. V. Actually the total motion of the diaphragm and its attached parts need not be more than $\frac{1}{16}''$ permitting valves 21 and 22 to leave their respective seats $\frac{3}{32}''$.

The inward movement of the diaphragm 6 toward the chamber 7 lifts the valve 21 off from its seat 26 assisted by pressure underneath it, and water under pressure will flow through the duct 24 from the water supply line 19 as shown and promptly fill the measuring chamber 8, this pressure assisting the inward movement of the diaphragm 6 as shown in Fig. V and firmly closing the valve 22 to seal the combined opening and valve seat 22a. Hence the measuring chamber 8 will receive a measured quantity of water.

When the flow stops due to the closing of the master fixture 16, pressures in the chambers 7 and 8 will instantly equalize due to the entire cessation of the vacuumatic action of the ejector 45. Due, however, to the fact that the opening and valve seat 22a is under pressure, the pressures in the chamber are enough influenced by the unbalanced area of 22a so that the valve 22 will open to assume the position shown in Fig. II, the static pressure in the chamber 8 will be instantaneously reduced by the opening of the valve, the diaphragm 6 will assert itself due to the superposed load in the chamber 7 and the valve 21 will be firmly engaged with its seat 26 preventing further increase of water through the duct 24. Hence the amount of water delivered to the trap pipe 11 will be the contents of the chamber 8 as it existed at the time the master fixture 16 was closed, plus a few drops and no more.

The measuring chamber 8 will therefore fill once only, each time the master fixture 16 is well opened, but will not operate for even substantial leaks, because no vacuum or substantially lowered pressure will be induced by the ejector 45. It will be noted that there is no moving part in the main water passageway from 19 to 17.

The advantages of this arrangement have been explained in the preliminary statement and this disclosure will permit anyone skilled in the mechanic arts and familiar with hydromechanics to make and use this device in the various forms in which it may be embodied and which are indicated by the subjoined claims.

What I claim as new and desire to secure by Letters Patent, is—

1. In a primer valve for insertion in a water supply line, a body, a passageway therethrough that includes a chamber, a flexible wall for said chamber, ejector jets within the chamber that are effective to flex said wall, an intermediate outlet for said passageway that is positioned beyond one end of the chamber and valve means for controlling said intermediate outlet that are operative by flexing of said flexible wall.

2. A primer valve, having in combination therewith a body for insertion in a water supply line, a passageway therethrough defined in part as a pair of ejector jets, surrounded by a chambered portion of said passageway, a flexible wall for said chambered portion that is movable by flow through the jets, an intermediate outlet for said passageway beyond one end of said chambered portion, valve means for controlling flow from said outlet and transmissions between said flexible wall and said valve.

3. A primer valve having in combination, a chamber, ejector tubes in said chamber, a movable member comprising one wall of said chamber, trap supply means adjacent said primer valve and control means interconnected between said movable member and said trap supply means that are effective to measure the amount of discharge to said trap supply means.

4. A primer valve having in combination, a chamber, ejector tubes in said chamber, a movable member comprising one wall of said chamber, trap supply means adjacent said primer valve and control means interconnected between said movable member and said trap supply means that are effective to determine periods of time that the trap supply means are open for purpose of discharge.

5. A primer valve comprising a body for insertion in a water supply line to a master fixture, an intermediate outlet formed in said body, a measuring chamber positioned adjacent said body one wall of which is a diaphragm, ejector nozzles positioned within said chamber that are effective to cause movement of the diaphragm by varying pressure in the chamber under the influence of fluid flow through the said nozzles, a conduit positioned to convey fluid from said intermediate outlet, a measuring chamber intermediate said outlet and said conduit and mechanisms operable by movement of the diaphragm to alternately fill and empty said measuring chamber according to flow and interruption thereof through said nozzles.

6. A primer valve having in combination a body for insertion in a water supply line to a fixture, an intermediate outlet formed in said body, a chamber formed in said body, ejector tubes in said chamber, a measuring container positioned adjacent the chamber of the body, a flexible diaphragm forming a common wall between the body chamber and the measuring chamber, conduit means to supply water to said measuring chamber, valve means controlling said conduit means, a priming pipe positioned to receive the contents of the measuring chamber, a valve therebetween and transmissions between the flexible diaphragm and the valves that are effective to reversely connect the measuring chamber to water supply and to the priming pipe.

7. A primer valve for insertion in a water supply line to a plumbing fixture, comprising a body having an inner chamber, ejector jets aligned in said chamber that comprise part of a flow passageway through the body, a measuring chamber adjacent said body, a flexible diaphragm that is a wall common to said inner chamber and said measuring chamber, a supply conduit for the measuring chamber, a discharge pipe therefrom and valve means controlled by movement of the diaphragm that are effective for filling the measuring chamber and emptying it into the discharge pipe.

8. A flow control structure comprising a body containing a chamber, that is insertable in a fluid supply line, ejector tubes in the chamber that form a part of the fluid passageway, a diaphragm positioned to be responsive to varying pressures influenced by the ejector tubes and a valve system associated with the diaphragm that is effective to control separate fluid flow devices under the influence of movement of the diaphragm.

9. A flow operative structure comprising a body containing a chamber, that is insertable in a fluid supply line, ejector tubes in the chamber that form a part of the fluid passageway through the body, a diaphragm positioned to be responsive to pressure conditions within the chamber and control devices associated with the diaphragm that are effective to operate controls in accordance with pressure changes within the chamber.

GEORGE F. McDOUGALL.